US012643593B2

(12) United States Patent
Shin

(10) Patent No.: US 12,643,593 B2
(45) Date of Patent: Jun. 2, 2026

(54) STEERING APPARATUS FOR VEHICLE INCLUDING BENDING PLATE

(71) Applicant: HL MANDO CORPORATION, Gyeonggi-do (KR)

(72) Inventor: Woojin Shin, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 19/193,947

(22) Filed: Apr. 29, 2025

(65) Prior Publication Data

US 2025/0346284 A1 Nov. 13, 2025

(30) Foreign Application Priority Data

May 7, 2024 (KR) ........................ 10-2024-0059795

(51) Int. Cl.
B62D 1/19 (2006.01)

(52) U.S. Cl.
CPC .................................... B62D 1/192 (2013.01)

(58) Field of Classification Search
CPC ........... B62D 1/19; B62D 1/192; B62D 1/195
See application file for complete search history.

(56) References Cited

U.S. PATENT DOCUMENTS

| | | | | |
|---|---|---|---|---|
| 5,669,634 | A * | 9/1997 | Heinzman .............. | B62D 1/195 74/493 |
| 6,942,250 | B2 * | 9/2005 | Dubay .................... | F16F 7/123 280/777 |
| 7,455,320 | B2 * | 11/2008 | Imamura ................ | B62D 1/195 280/777 |
| 10,604,172 | B2 * | 3/2020 | Yoon ....................... | B62D 1/187 |
| 10,773,747 | B2 * | 9/2020 | Ku .......................... | B62D 1/192 |
| 11,312,407 | B2 * | 4/2022 | Kwon .................... | B62D 1/185 |
| 11,685,422 | B1 * | 6/2023 | Tinnin ................... | B62D 1/195 74/493 |
| 11,685,423 | B1 * | 6/2023 | Tinnin ................... | B62D 1/195 280/775 |
| 11,753,064 | B2 * | 9/2023 | Tinnin .................... | B62D 1/19 74/492 |
| 2008/0023952 | A1 * | 1/2008 | Manwaring ............ | B62D 1/195 280/777 |
| 2016/0257333 | A1 | 9/2016 | Ku | |

FOREIGN PATENT DOCUMENTS

| | | |
|---|---|---|
| KR | 10-1559821 | 10/2015 |
| KR | 10-2016-0106236 | 9/2016 |
| KR | 10-2093228 | 3/2020 |

* cited by examiner

*Primary Examiner* — Laura Freedman
(74) *Attorney, Agent, or Firm* — WOMBLE BOND DICKINSON (US) LLP

(57) ABSTRACT

According to the present embodiments, a steering apparatus for a vehicle may be provided, which includes an upper tube for receiving a steering shaft, a fixing portion coupled to an outer surface of the upper tube, an insertion portion located on the inner side of the upper tube, and a bending plate including a bending portion connecting the fixing portion and the insertion portion.

19 Claims, 10 Drawing Sheets

*100*

STEERING APPARATUS FOR VEHICLE INCLUDING BENDING PLATE

CROSS-REFERENCE TO RELATED APPLICATIONS

This application claims the priority of Korean Patent Application No. 10-2024-0059795 field on May 7, 2024, in the Korean Intellectual Property Office, the disclosure of which is incorporated herein by reference.

BACKGROUND

Field

The present embodiments relate to a steering apparatus for a vehicle, and more specifically, to a steering apparatus for a vehicle that prevents interference between parts while minimizing an increase in cost, suppresses noise caused by vibration, and improves the stability of a collapse operation.

Description of the Related Art

A steering column of a vehicle is equipped with a collapse structure in which a steering column and steering shaft axially contract and absorb shock to prevent an upper body of a driver from hitting the steering wheel and causing injury in the event of a collision. This collapse structure absorbs a collision load through plastic deformation of a configuration called a bending plate or EA strap, and generally, one end of the bending plate is a fixed end that is fixed to the steering column and the other end thereof is a free end that is bent at the fixed end.

However, there is a problem that the free end of the bending plate vibrates in normal conditions such as traveling conditions, causing noise due to vibration, or interfering with surrounding parts and reducing the steering feel of the driver. In particular, the collapse operation may not be performed smoothly due to interference between the bending plate and surrounding parts, and the bending plate may not be able to absorb the shock applied to the driver.

SUMMARY

The present embodiments have been devised against the background described above, and relate to a steering apparatus for a vehicle that prevents interference between parts while minimizing cost increase, suppresses noise caused by vibration, and improves the stability of collapse operation.

According to the present embodiments, there may be provided a steering apparatus for a vehicle, the steering apparatus including: an upper tube for accommodating a steering shaft; and a bending plate including a fixing portion coupled to an outer surface of the upper tube, an insertion portion located inside the upper tube, and a bending portion connecting the fixing portion and the insertion portion.

In addition, according to the present embodiments, there may be provided a steering apparatus for a vehicle, the steering apparatus including: an upper tube for accommodating a steering shaft; a bending plate including a fixing portion coupled to an outer surface of the upper tube, an insertion portion located inside the upper tube, and a bending portion connecting the fixing portion and the insertion portion; and a support member coupled to an inner surface of the upper tube and pressing the insertion portion toward the inner surface of the upper tube.

According to the present embodiments, interference between parts may be prevented while minimizing cost increase, noise generation due to vibration may be suppressed, and the stability of collapse operation may be improved.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
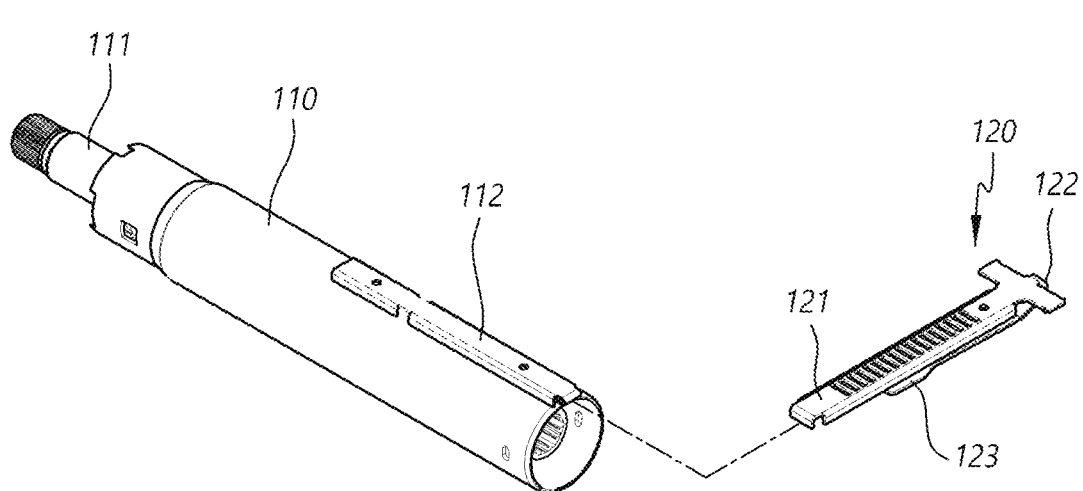
FIG. 1 is an exploded perspective view of a steering apparatus of a vehicle according to the present embodiments.

In the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Figure 2:
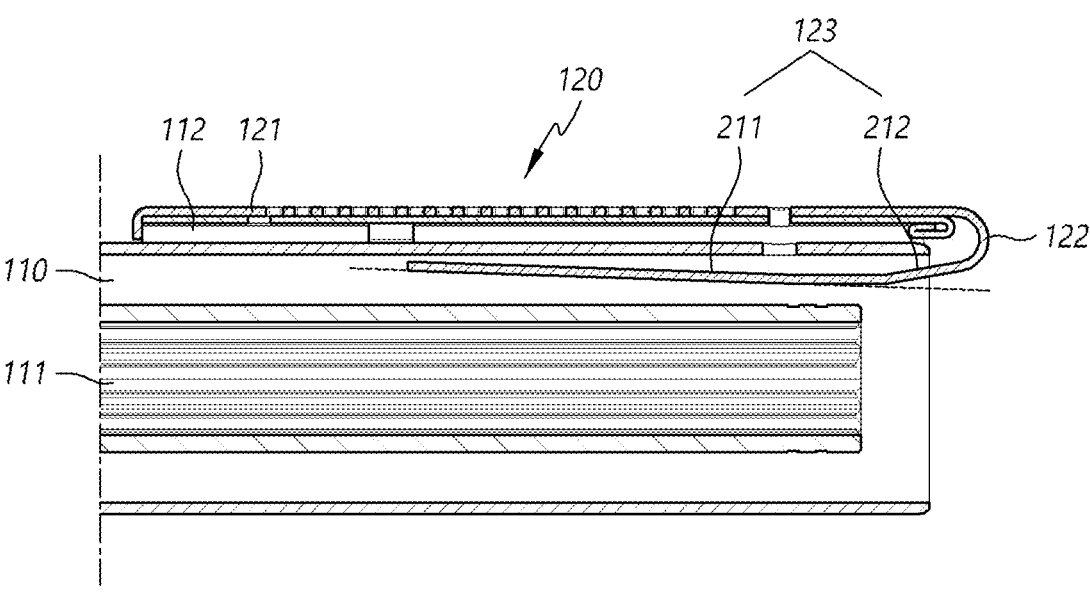
FIG. 2 is a cross-sectional view of a part of the steering apparatus of the vehicle according to the present embodiments.
Figure 3:
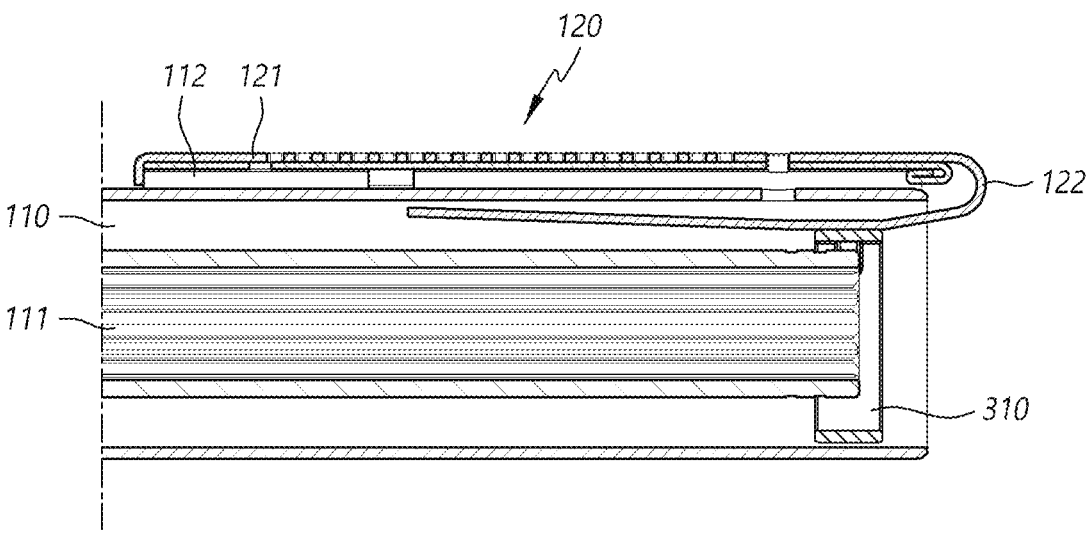
FIG. 3 is a cross-sectional view of a part of the steering apparatus of the vehicle according to the present embodiments.
Figure 4:
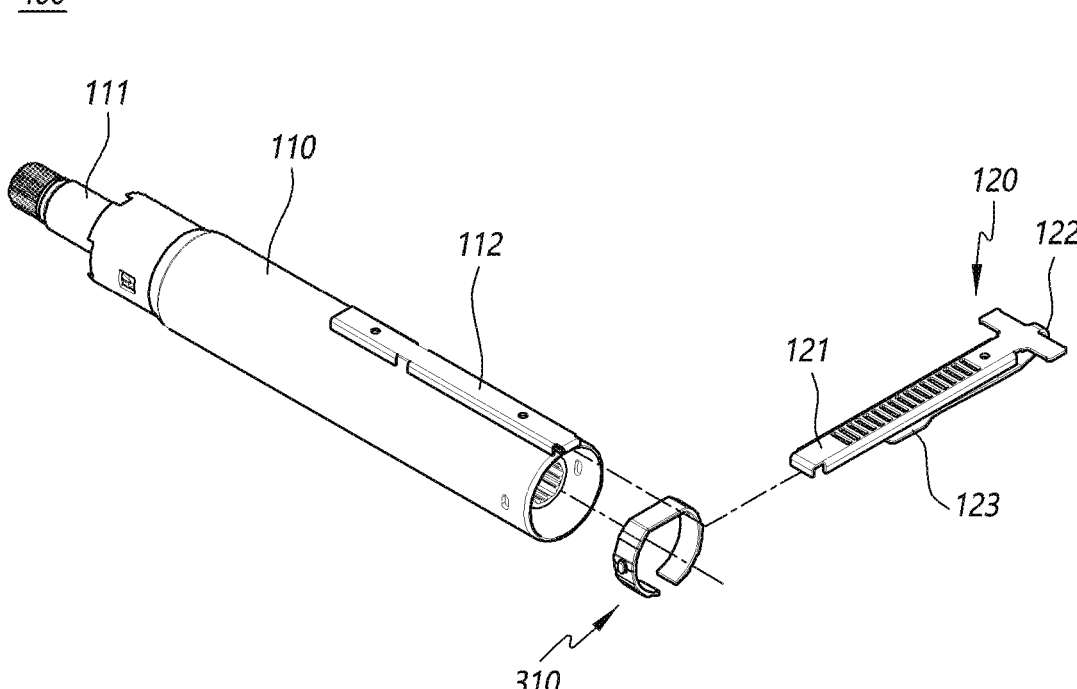
FIG. 4 is an exploded perspective view of a steering apparatus of a vehicle according to the present embodiments.
Figure 5:
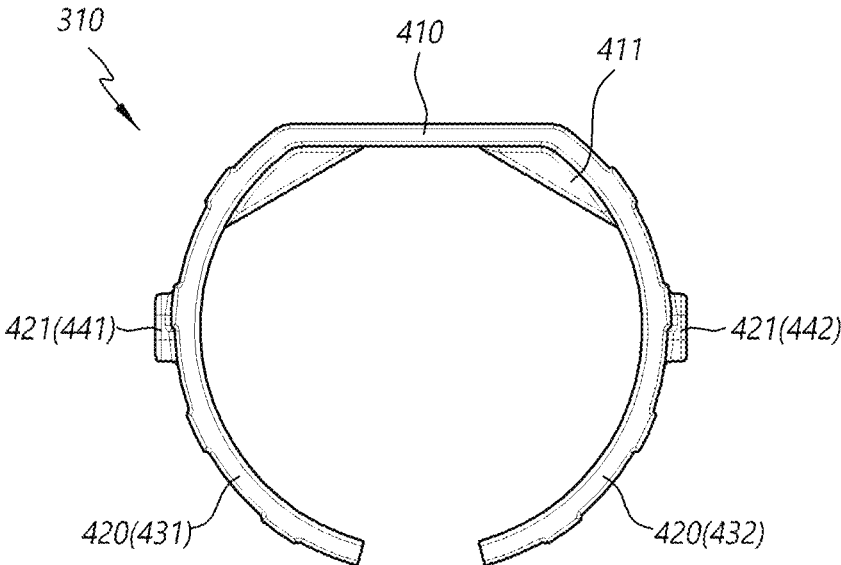
FIG. 5 is a front view of a part of the steering apparatus of the vehicle according to the present embodiments.
Figure 6:
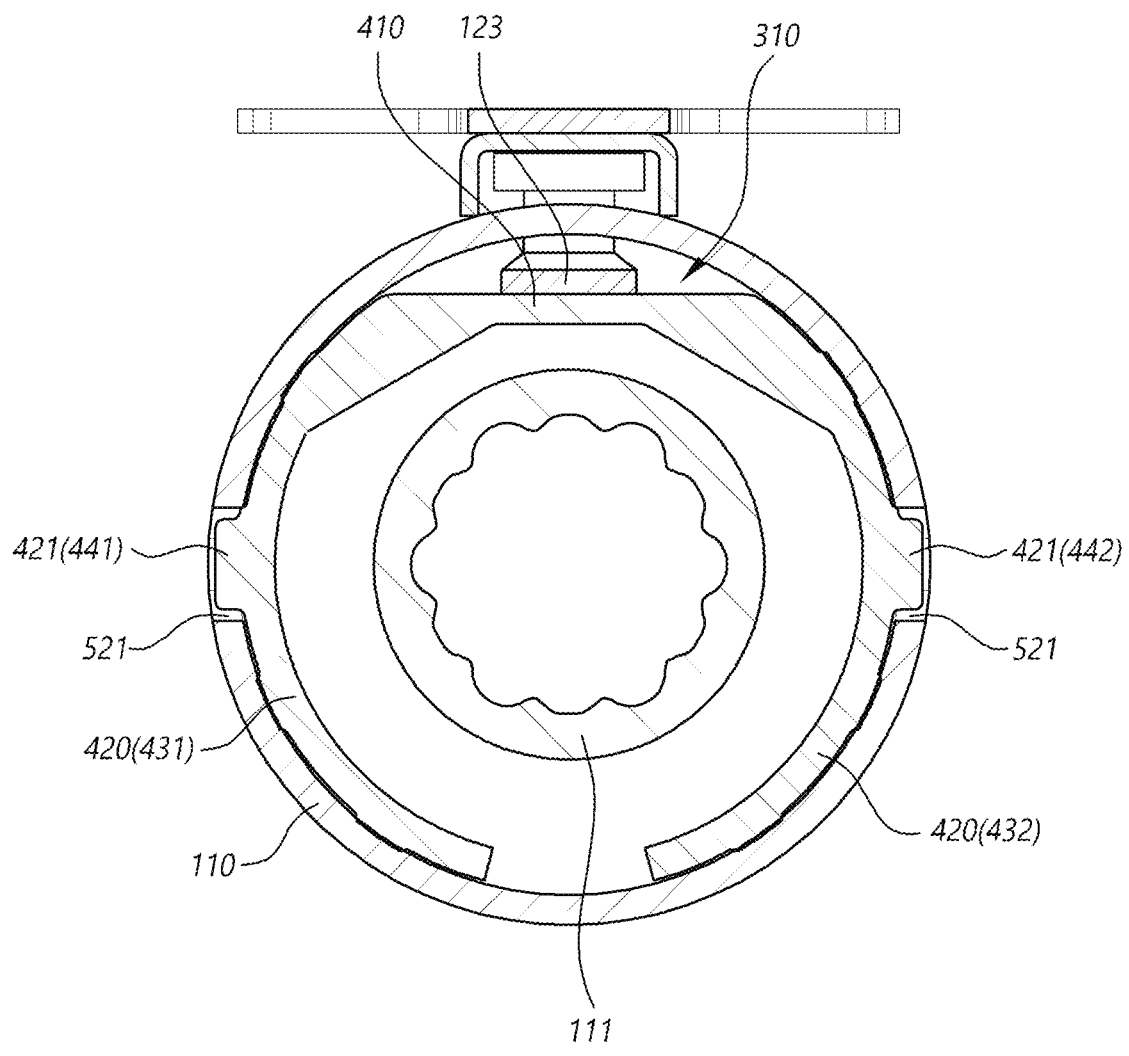
FIG. 6 is a cross-sectional view of a part of the steering apparatus of the vehicle according to the present embodiments.
Figure 7:
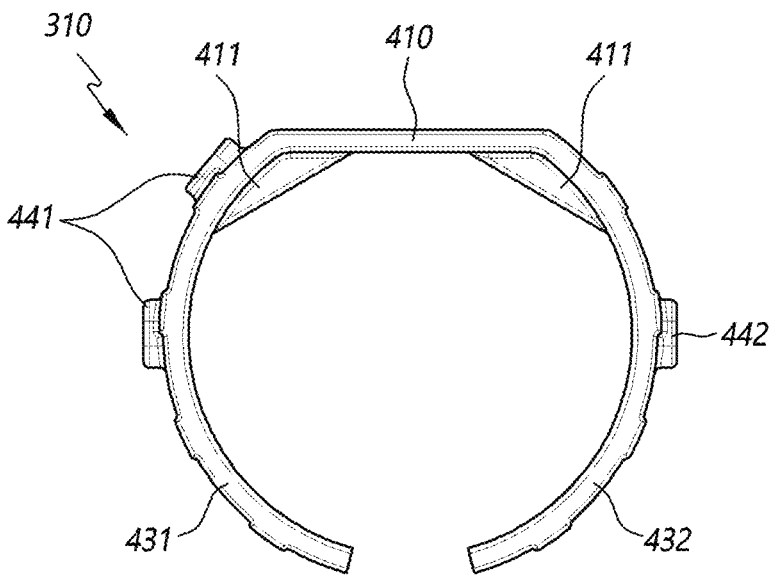
FIG. 7 is a front view of a part of the steering apparatus of the vehicle according to the present embodiments.
Figure 8:
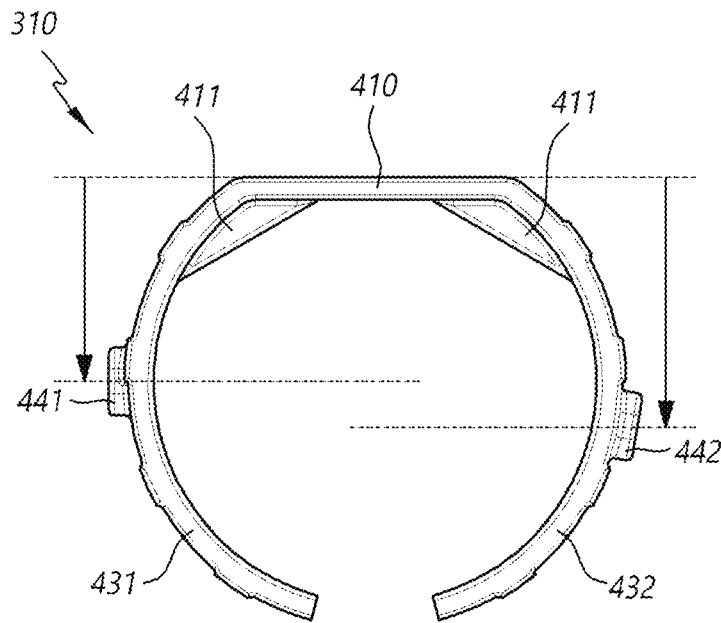
FIG. 8 is a front view of a part of the steering apparatus of the vehicle according to the present embodiments.
Figure 9:
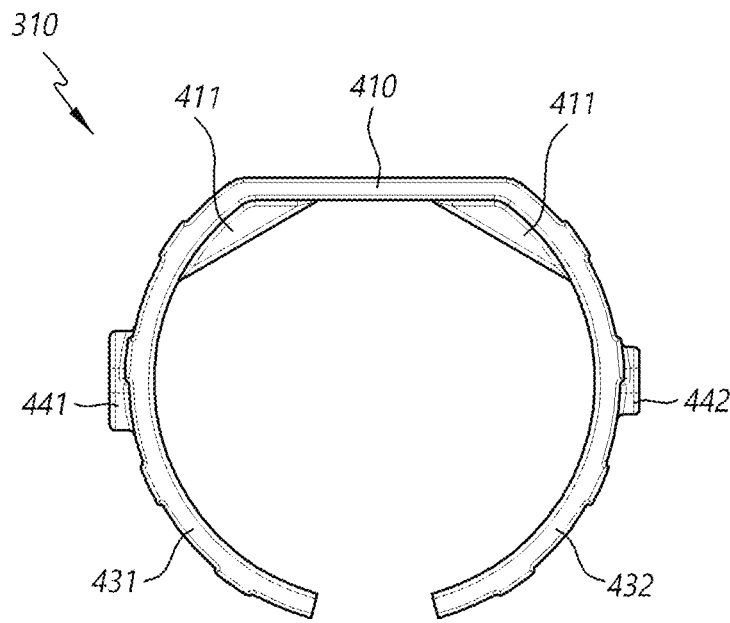
FIG. 9 is a front view of a part of the steering apparatus of the vehicle according to the present embodiments.
Figure 10:
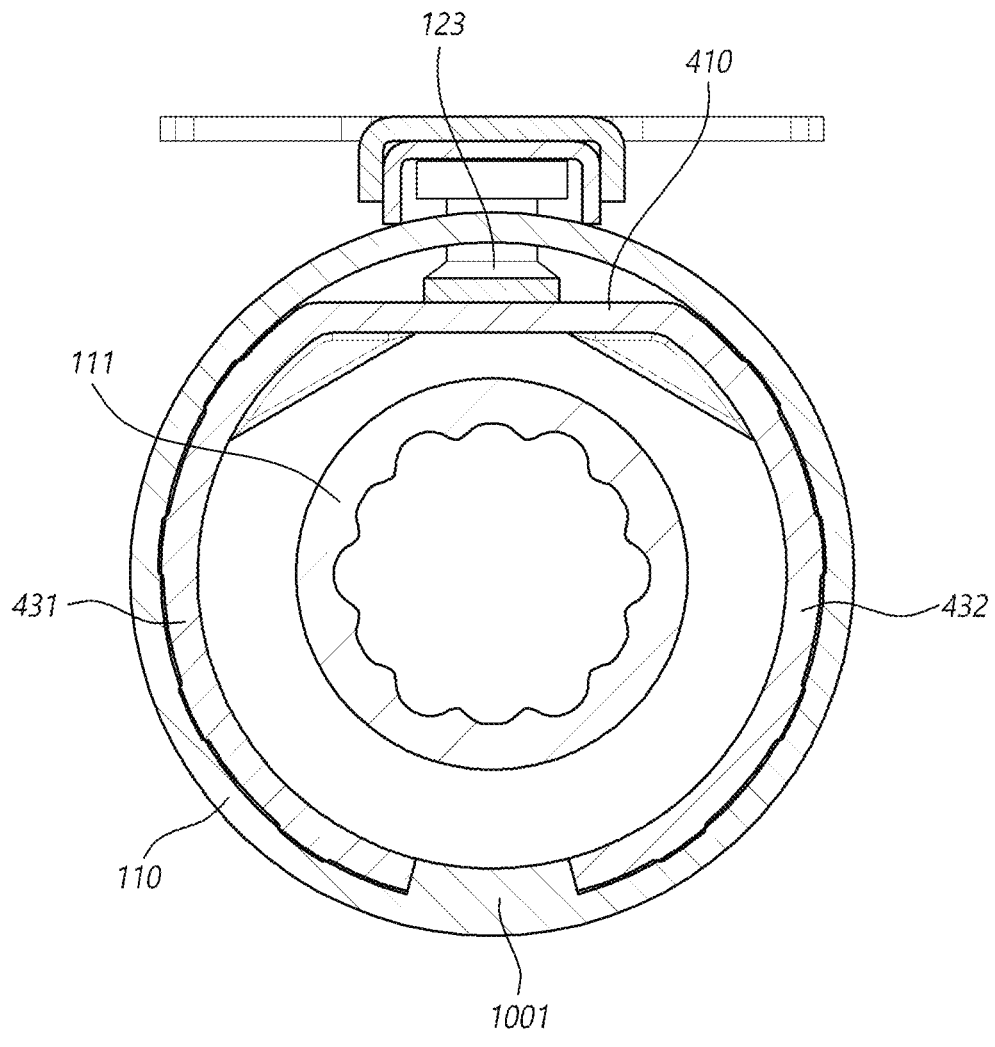
FIG. 10 is a cross-sectional view of a part of the steering apparatus of the vehicle according to the present embodiments.

FIG. 1 is an exploded perspective view of a steering apparatus of a vehicle according to the present embodiments, FIG. 2 is a cross-sectional view of a part of the steering apparatus of the vehicle according to the present embodiments, FIG. 3 is a cross-sectional view of a part of the steering apparatus of the vehicle according to the present embodiments, FIG. 4 is an exploded perspective view of a steering apparatus of a vehicle according to the present embodiments, FIG. 5 is a front view of a part of the steering apparatus of the vehicle according to the present embodiments, FIG. 6 is a cross-sectional view of a part of the steering apparatus of the vehicle according to the present embodiments, FIG. 7 is a front view of a part of the steering apparatus of the vehicle according to the present embodiments, FIG. 8 is a front view of a part of the steering apparatus of the vehicle according to the present embodiments, FIG. 9 is a front view of a part of the steering apparatus of the vehicle according to the present embodiments, and FIG. 10 is a cross-sectional view of a part of the steering apparatus of the vehicle according to the present embodiments.

First, the present embodiments will be described with reference to FIGS. 1 to 3.

According to the present embodiments, a steering apparatus 100 for a vehicle may be provided, which includes a bending plate 120 including an upper tube 110 that accommodates a steering shaft 111, a fixing portion 121 coupled to an outer surface of the upper tube 110, an insertion portion 123 located inside the upper tube 110, and a bending portion 122 that connects the fixing portion 121 and the insertion portion 123.

In addition, the insertion portion 123 may include a front end 212 connected to the bending portion 122 and a rear end 211 bent from the front end 212 so that a gap with the fixing portion 121 is reduced.

Referring to FIG. 1, the steering apparatus 100 of the vehicle according to the present embodiments includes the upper tube 110 and the bending plate 120. The upper tube 110 accommodates a steering shaft 111, and the bending plate 120 includes the fixing portion 121, the insertion portion 123, and the bending portion 122.

The steering apparatus 100 of the vehicle according to the present embodiments may further include a configuration such as a lower tube, a mounting bracket, or the like, and since the specific structure is the same as that of a generally known steering apparatus, a detailed description is omitted.

The fixing portion 121 of the bending plate 120 is connected to the upper tube 110, and the insertion portion 123 connected to the fixing portion 121 and the bent bending portion 122 is located inside the upper tube 110.

The fixing portion 121 may be coupled to a bracket 112 coupled to the outer surface of the upper tube 110. In a case where the collapse operation is performed, the steering column contracts and the upper tube 110 slides relative to the lower tube. The fixing portion 121 is coupled to the upper tube 110 and is fixed to a vehicle body, and thus, in a case where the collapse operation starts, the coupling between the fixing portion 121 and the upper tube 110 is deactivated.

Accordingly, the upper tube 110 is supported by the bending portion 122 of the bending plate 120, and as the upper tube 110 continues to slide and plastic deformation of the bending plate 120 occurs, the shock is absorbed.

In the conventional structure, in a case where vibration occurs in the insertion portion located inside the upper tube during normal situations such as traveling, the insertion portion hits surrounding parts, especially the steering shaft, and thus, noise occurs. In addition, during the collapse operation, the insertion portion of the bending plate may interfere with surrounding parts, and a smooth collapse operation may not be performed, resulting in a problem in which the shock is not absorbed.

However, according to the steering apparatus 100 of the vehicle according to the present embodiments, the insertion portion 123 of the bending plate 120 may be prevented from colliding with surrounding parts, thereby improving noise performance and enhancing the stability of the collapse operation. In addition, since the addition of additional configurations is minimized, the increase in cost is minimized.

Specifically, referring to FIG. 2, the insertion portion 123 of the bending plate 120 of the steering apparatus 100 of the vehicle according to the present embodiments includes the front end 212 and the rear end 211.

The front end 212 is a portion connected to the bending portion 122, and the rear end 211 is a portion that is bent and extended from the front end 212. The rear end 211 is bent so that the gap with the fixing portion 121 with respect to the front end 212 is reduced.

That is, there is a vertical gap between the fixing portion 121 and the insertion portion 123 based on the drawing, and the rear end 211 is provided to be bent upward from the front end 212. Accordingly, even in a case where vibration occurs in the insertion portion 123, collision between the steering shaft 111 and the insertion portion 123 is reduced, noise performance is improved, and smooth collapse operation may be performed.

Referring to FIG. 3, according to one embodiment, the steering apparatus 100 of the vehicle according to the present embodiments may further include a support member 310 coupled to the inner surface of the upper tube 110 and pressing the insertion portion 123 toward the inner surface of the upper tube 110.

The support member 310 is formed in a roughly circular or ring shape and coupled to the inner surface of the upper tube 110, and the steering shaft 111 may be provided to penetrate the support member 310. The support member 310 is coupled to the inner surface of the upper tube 110 and is supported by the insertion portion 123.

Specifically, the support member 310 is provided between the steering shaft 111 and the insertion portion 123 to press the insertion portion 123 toward the inner surface of the upper tube 110, that is, in the direction away from the steering shaft 111.

Accordingly, since the support member 310 presses the insertion portion 123 toward the inner surface of the upper tube 110, the collision between the insertion portion 123 and the steering shaft 111 is mechanically prevented and noise performance is improved. In addition, since the support member 310 is provided to be supported by the outer surface of the insertion portion 123, the collapse operation may be smoothly performed without being hindered by the support member 310.

In one embodiment, the support member 310 may be supported by the insertion portion 123 at the boundary between the front end 212 and the rear end 211. That is, the support member 310 may be supported at a portion of the insertion portion 123 that is closest to the steering shaft 111. Accordingly, the collision between the insertion portion 123 and the steering shaft 111 may be mechanically prevented by the support member 310.

In one embodiment, the support member 310 may be formed of an elastic material. Accordingly, the support member 310 may effectively absorb vibration of the insertion portion 123 supported by the support member 310. For example, the support member 310 may be formed of various engineering plastics, and among them, may be formed of polyacetal.

Next, the present embodiments will be described with reference to FIGS. 4 to 10.

According to the present embodiments, a steering apparatus 400 for a vehicle may be provided, which includes an upper tube 110 that accommodates a steering shaft 111, a fixing portion 121 coupled to an outer surface of the upper tube 110, an insertion portion 123 located inside the upper tube 110, a bending plate 120 that includes a bending portion 122 that connects the fixing portion 121 and the insertion portion 123, and a support member 310 that is coupled to the inner surface of the upper tube 110 and presses the insertion portion 123 toward the inner surface of the upper tube 110.

For matters identical to those in the above-described embodiments below, the same drawing symbols will be used, detailed descriptions will be omitted, and explanations will be focused on differences.

The support member 310 is provided to be joined to the inner surface of the upper tube 110 and supported by the insertion portion 123, and collision between the insertion portion 123 and the steering shaft 111 is mechanically prevented, noise performance is improved, and collapse operation may be smoothly performed. In addition, since the addition of additional configurations is minimized, cost increase is minimized.

In one embodiment, the insertion portion 123 may include a front end 212 connected to the bending portion 122 and a rear end 211 bent from the front end 212 so that a gap with the fixing portion 121 is reduced. Accordingly, even in a case where vibration occurs in the insertion portion 123, collision between the steering shaft 111 and the insertion portion 123 is reduced, noise performance is improved, and smooth collapse operation may be performed.

In one embodiment, the support member 310 may be supported by the insertion portion 123 at the boundary between the front end 212 and the rear end 211.

In one embodiment, the support member 310 may be formed of an elastic material. For example, the support member 310 may be formed of various engineering plastics, and among them, may be formed of polyacetal.

Referring to FIG. 5, according to one embodiment, the support member 310 may include a coupling portion 420 coupled to the inner surface of the upper tube 110 and a supporting portion 410 supported by the insertion portion 123. The support member 310 may be formed in an approximately ring shape.

The coupling portion 420 includes a first coupling portion 431 and a second coupling portion 432, as will be described in detail later, and the outer surface of the coupling portion 420 is supported by and connected to the inner surface of the upper tube 110. As will be described later, the coupling portion 420 is not only connected to the upper tube 110 by a coupling protrusion 421 and a coupling hole 521 but is also supported by the upper tube 110 by the outward elastic force of the coupling portion 420.

After the support member 310 may be inserted into the interior of the upper tube 110 in a state where the coupling portion 420 is contracted inward, the coupling portion 420 may be elastically restored to the outside and coupled to the upper tube 110.

In one embodiment, a reinforcing rib 411 may be formed between the coupling portion 420 and the supporting portion 410. The support member 310 may be formed of an elastic plastic material. In this case, since the support member 310 includes the reinforcing rib 411, the coupling portion 420 may be prevented from bending inward after injection molding.

Referring to FIG. 6, according to one embodiment, the supporting portion 410 may be provided spaced apart from the inner surface of the upper tube 110, and the insertion portion 123 may be supported by the outer surface of the supporting portion 410. As illustrated in the drawings, a space is formed between the supporting portion 410 and the upper tube 110 in which the insertion portion 123 may be positioned.

The supporting portion 410 presses the insertion portion 123 located between the supporting portion 410 and the upper tube 110 in the direction away from the steering shaft 111.

According to one embodiment, the coupling protrusion 421 may be formed on the outer surface of the coupling portion 420, and the coupling hole 521 into which the coupling protrusion 421 is inserted may be formed in the upper tube 110. The coupling portion 420 is coupled to the upper tube 110 by the elastic force of the coupling portion 420 and the engagement of the coupling protrusion 421 and the coupling hole 521.

Meanwhile, in a case where the support member 310 is incorrectly or reversely assembled to the upper tube 110, the role of the support member 310 in pressurizing the insertion portion 123 may not be performed.

In one embodiment, the coupling portion 420 may include a first coupling portion 431 connected to one end of the supporting portion 410 and a second coupling portion 432 connected to the other end of the supporting portion 410.

By preventing the second coupling portion 432 from being coupled at the position where the first coupling portion 431 is coupled to the upper tube 110, or by preventing the first coupling portion 431 from being coupled at the position where the second coupling portion 432 is coupled to the upper tube 110, incorrect or reverse assembly of the support member 310 may be prevented.

In addition, according to one embodiment, a first coupling protrusion 441 may be formed on the outer surface of the first coupling portion 431, and a second coupling protrusion 442 may be formed on the outer surface of the second coupling portion 432. In the upper tube 110, a coupling hole (hereinafter, referred to as a first coupling hole for convenience of explanation) corresponding to the first coupling protrusion 441 and a coupling hole (hereinafter, referred to as a second coupling hole for convenience of explanation) corresponding to the second coupling protrusion 442 are formed.

Referring to FIG. 7, according to one embodiment, the first coupling protrusion 441 and the second coupling protrusion 442 are each provided at least one, and may be provided in different numbers.

FIG. 7 illustrates an embodiment in which two first coupling protrusions 441 are provided as the first coupling portion 431 and one second coupling protrusion 442 is provided as the second coupling portion 432. Accordingly, the upper tube 110 is provided with two first coupling holes corresponding to the first coupling protrusions 441 of the first coupling portion 431 and one second coupling hole corresponding to the second coupling protrusion 442 of the second coupling portion 432.

Therefore, it is easy to identify the coupling position of the support member 310 according to the number and position of the coupling holes 521 formed in the upper tube 110, thereby preventing incorrect assembly or reverse assembly.

Referring to FIG. 8, the first coupling protrusion 441 and the second coupling protrusion 442 may be positioned at different heights with respect to the supporting portion 410. FIG. 8 illustrates an embodiment in which the second coupling protrusion 442 is positioned further downward with respect to the supporting portion 410 than the first coupling protrusion 441.

Accordingly, it is easy to identify the coupling position of the support member 310 according to the position of the coupling hole 521 formed in the upper tube 110, thereby preventing incorrect assembly or reverse assembly.

Referring to FIG. 9, the size of the first coupling protrusion 441 and the size of the second coupling protrusion 442 may be different from each other. FIG. 9 illustrates an embodiment in which the first coupling protrusion 441 is formed longer in the vertical direction than the second coupling protrusion 442. The first coupling hole and the second coupling hole have sizes corresponding to the first coupling protrusion 441 and the second coupling protrusion 442, respectively.

Accordingly, it is easy to identify the coupling position of the support member 310 according to the size of the coupling hole 521 formed in the upper tube 110, thereby preventing incorrect assembly or reverse assembly.

Referring to FIG. 10, the end of the first coupling portion 431 and the end of the second coupling portion 432 are spaced apart from each other, and an insertion protrusion 1001 inserted between the ends of the first coupling portion 431 and the second coupling portion 432 may be formed on the inner surface of the upper tube 110.

Accordingly, the coupling position of the support member 310 to the upper tube 110 is easily identified from the insertion protrusion 1001, and incorrect assembly or reverse assembly is prevented.

According to the steering apparatus for the vehicle having the above-described shape, it is possible to prevent interference between parts while minimizing cost increase, suppress noise caused by vibration, and improve the stability of collapse operation.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

What is claimed is:

1. A steering apparatus for a vehicle, the steering apparatus comprising:
   an upper tube for accommodating a steering shaft; and
   a bending plate including a fixing portion coupled to an outer surface of the upper tube, an insertion portion located inside the upper tube, and a bending portion connecting the fixing portion and the insertion portion,
   wherein the insertion portion includes a front end connected to the bending portion and a rear end bent from the front end so that a gap with the fixing portion is reduced.

2. The steering apparatus for a vehicle of claim 1, wherein the gap is provided between the fixing portion and the insertion portion.

3. The steering apparatus for a vehicle of claim 1, further comprising a support member coupled to an inner surface of the upper tube and pressing the insertion portion toward the inner surface of the upper tube.

4. The steering apparatus for a vehicle of claim 3, wherein the support member is supported by the insertion portion at a boundary between the front end and the rear end of the insertion portion.

5. The steering apparatus for a vehicle of claim 3, wherein the support member is formed of an elastic material.

6. A steering apparatus for a vehicle, the steering apparatus comprising:
   an upper tube for accommodating a steering shaft;
   a bending plate including a fixing portion coupled to an outer surface of the upper tube, an insertion portion located inside the upper tube, and a bending portion connecting the fixing portion and the insertion portion; and
   a support member coupled to an inner surface of the upper tube and pressing the insertion portion toward the inner surface of the upper tube.

7. The steering apparatus for a vehicle of claim 6, wherein the insertion portion includes a front end connected to the bending portion and a rear end bent from the front end so that a gap with the fixing portion is reduced.

8. The steering apparatus of for a vehicle claim 7, wherein the support member is supported by the insertion portion at a boundary between the front end and the rear end.

9. The steering apparatus for a vehicle of claim 6, wherein the support member is formed of an elastic material.

10. The steering apparatus for a vehicle of claim 6, wherein the support member includes a coupling portion coupled to the inner surface of the upper tube and a supporting portion supported by the insertion portion.

11. The steering apparatus for a vehicle of claim 10, wherein a reinforcing rib is formed between the coupling portion and the supporting portion.

12. The steering apparatus for a vehicle of claim 10, wherein the supporting portion is provided spaced apart from the inner surface of the upper tube, and the insertion portion is supported by an outer surface of the supporting portion.

13. The steering apparatus for a vehicle of claim 10, wherein a coupling protrusion is formed on an outer surface of the coupling portion, and a coupling hole into which the coupling protrusion is inserted is formed in the upper tube.

14. The steering apparatus for a vehicle of claim 10, wherein the coupling portion includes a first coupling portion connected to one end of the supporting portion and a second coupling portion connected to the other end of the supporting portion.

15. The steering apparatus for a vehicle of claim 14, wherein a first coupling protrusion is formed on an outer surface of the first coupling portion, and a second coupling protrusion is formed on an outer surface of the second coupling portion.

16. The steering apparatus for a vehicle of claim 15, wherein the first coupling protrusion and the second coupling protrusion are provided in different numbers.

17. The steering apparatus for a vehicle of claim 15, wherein the first coupling protrusion and the second coupling protrusion are positioned at different heights with respect to the supporting portion.

18. The steering apparatus for a vehicle of claim 15, wherein a size of the first coupling protrusion and a size of the second coupling protrusion are different from each other.

19. The steering apparatus for a vehicle of claim 14, wherein an end of the first coupling portion and an end of the second coupling portion are spaced apart from each other, and an insertion protrusion inserted between the ends of the first coupling portion and the second coupling portion is formed in the inner surface of the upper tube.

* * * * *